United States Patent [19]

Knobel et al.

[11] Patent Number: 4,794,127

[45] Date of Patent: Dec. 27, 1988

[54] OXYNITRATE ADDITIVE FOR POLYURETHANE FOAMS

[75] Inventors: Thomas M. Knobel; Mary A. Walker, both of Lake Jackson, Tex.

[73] Assignee: The Dow Chemical Company, Midland, Mich.

[21] Appl. No.: 166,856

[22] Filed: Mar. 11, 1988

[51] Int. Cl.⁴ .................................................. C08J 9/00
[52] U.S. Cl. ..................................... 521/123; 521/170; 521/174
[58] Field of Search ........................ 521/123, 174, 170

[56] References Cited

U.S. PATENT DOCUMENTS

| | | | |
|---|---|---|---|
| 3,171,820 | 3/1965 | Volz | 521/61 |
| 3,454,504 | 7/1969 | Murai et al. | 521/110 |
| 3,627,565 | 12/1971 | Plueddemann | 427/386 |
| 3,673,159 | 6/1972 | Bijkhuizen et al. | 521/121 |
| 3,793,237 | 2/1974 | Watkinson | 521/107 |
| 3,884,848 | 5/1975 | Ricciardi et al. | 521/110 |
| 3,920,587 | 11/1975 | Watkinson | 521/111 |
| 3,941,849 | 3/1976 | Herold | 528/92 |
| 4,139,660 | 2/1979 | Tur | 427/353 |
| 4,200,701 | 4/1980 | Wetton et al. | 528/44 |
| 4,374,760 | 2/1983 | Charles | 252/518 |

FOREIGN PATENT DOCUMENTS 1553989 11/1978 United Kingdom.

OTHER PUBLICATIONS

Rossmy et al., in "Cell–Opening in One-Shot Flexible Polyether Based Polyurethane Foams. The Role of Silicone Surfactant and its Foundation in the Chemistry of Foam Formation", J. Cellular Plastics, Jan./Feb., 1977 pp. 26-35.

*Primary Examiner*—Morton Foelak

[57] ABSTRACT

In a process for producing polyurethane foam by allowing a reaction mixture comprising at least one polyisocyanate component and at least one polyfunctional active hydrogen component to react, a compound selected from the group consisting of oxynitrate salts of metals of Group IV B of the Mendeleef periodic table, is employed as a cell opening additive. Such oxynitrate salts are also effective to modify tin tolerance of urethane formulations. The oxynitrate compounds are effective in both free rise and molded foam processes. Cell opening is accomplished, for instance, by reacting toluene diisocyanate with a polypropoxy/polyethoxy polyol in the presence of an oxynitrate salt of a Group IV B metal, such as zirconium oxynitrate, to form a foam having more open cells than a similar foam without oxynitrate.

34 Claims, No Drawings

OXYNITRATE ADDITIVE FOR POLYURETHANE FOAMS

This invention generally concerns the field of polyurethane foams. More specifically, it concerns formation of open cell polyurethane foams.

Formation of a foamed or cellular polyurethane involves generation, volatilization or expansion of a gas or vapor during polymerization of a reaction mixture of polyurethane-forming components while the reaction mixture is in a liquid or plastic state. As the gas or vapor expands, bubbles are formed in the reaction mixture. The bubbles expand, forming cells of approximately spherical shape in the reaction mixture. As more cells form and cells expand, they contact one another and, when optimum packing structure is achieved, take generally polygonal shapes having generally polygonal sides or faces in common with adjacent cells. Membranes of polyurethane are formed at the faces. At intersections of the faces there are heavier strands of material. When the polyurethane solidifies, these strands provide a skeletal framework for the foam. Although there are cells of varying geometry in an actual foam, a general structure having heavier skeletal strands and thinner membranous faces is obtained.

An open cell foam is a foam in which sufficient membranes are absent or broken from the faces of the cells that there is communication between cells. A free rise foam, e.g. slab foam, is generally considered open cell when there is little or no resistance to the forced passage of air. Free rise foams having air flow measurements of less than 0.1 cubic feet per minute are referred to as closed cell foams.

In the case of molded foams, closed cell foams generally shrink markedly after foaming because gas trapped in the foam cells contracts with cooling, lowering the pressure in the cells such that they cannot withstand atmospheric pressure. Open cell foams shrink less than closed cell foams because communication between cells allows equalization of pressure inside and outside each cell. Lack of substantial shrinkage generally indicates presence of open cells. Ingredients of a formulation for forming a molded foam are carefully balanced to achieve a foam which neither shrinks substantially nor collapses. When there are insufficient open cells in a foam, crushing of the foam, e.g. by passing it between rollers, is often necessary.

Open cell foams are porous and are useful as filters, gas-liquid contacting devices, catalyst carriers, rug pads, door mats, sponges, insulating pads, spacing devices, mattresses, flexible partitions, baffles, diffusers, draperies, upholstering padding, pillows, linings for fabrics, acoustic insulation and the like.

Open cell foams are often formed by reticulation, that is, by formation of a generally closed cell foam and removal of the membrane faces of the cells. Oxidation, hydrolysis, explosions, enzymes and the like have been used for reticulation.

Cell opening can also be achieved by adding certain compounds referred to as cell opening additives to formulations suitable for forming polyurethane foams. Several types of cell opening additives have been used to cause rupture of the membranes and cell opening during formation of a foam. Cell opening additives include siloxane-oxyalkylene block copolymers, mixtures of acetone and cyclopentane, alkyl and alkenyl esters. Such cell opening additives often interfere with some reactions in a formulation or otherwise affect the physical properties of a foam. Such additives have not achieved wide acceptance because they are often formulation specific, and resulting foams often exhibit cross-sectional non-uniformity in air flow.

Polyurethane foams are frequently sensitive to the amount of tin-containing catalyst used in preparation of the foam. An increase in the amount of tin-containing catalyst outside of a limited range for each foam formulation generally produces shrinkage of the foam. Use of less tin-containing catalyst than indicated by the range generally produces a split and friable foam. The range of amounts of tin-containing compounds that can be used without causing shrinkage or splitting sufficient to make the foam less useful for its intended purpose is referred to herein as tin tolerance. Tin tolerance varies widely with particular formulations used for foaming. Modification of tin tolerance facilitates the formulation of foams having desired physical properties.

SUMMARY OF THE INVENTION

In one aspect, the invention is a process for producing polyurethane foam by allowing a reaction mixture comprising at least one polyisocyanate component and at least one polyfunctional active hydrogen component to polymerize, the improvement which comprises employing as an additive, a compound selected from the group consisting of oxynitrate salts of metals of Group IV B of the Mendeleef periodic table.

In another aspect, the invention is a composition comprising a polyether polyol and at least one oxynitrate salt of a metal of Group IV B of the Mendeleef periodic table.

The oxynitrate additives used in the process of the invention are effective and widely applicable cell opening additives useful in a variety of polyurethane foam formulations and processes without causing significant deterioration of physical properties of foams formed. Cell opening is observed when the additives of the invention are used in polyurethane formulations suitable for forming slab stock foams or molded foams. The oxynitrate additives also generally modify the tin tolerance of a foam formulation. Generally, it is possible to use more tin-containing catalyst in a formulation having therein an oxynitrate salt than would be possible in the absence of the oxynitrate without substantial shrinkage.

DETAILED DESCRIPTION OF THE INVENTION

Oxynitrate additives used in the practice of the invention are compounds selected from the group consisting of oxynitrates of metals of Group IV B of the Mendeleef periodic table. Such compounds include zirconium, hafnium, and titanium oxynitrates. The oxynitrates are preferably used in the form of hydrated salts, more preferably where an average of at least about 2 water molecules is associated with each metal oxynitrate molecule. Zirconium oxynitrate, also known as zirconyl nitrate, $ZrO(NO_3)_2 \cdot X\ H_2O$ is preferred for use as a oxynitrate additive of the invention for reasons of safety, convenience, solubility and effectiveness. X is preferably from about 2 to about 6, more preferably from about 5 to about 6. Oxynitrates are commercially available in the form of powder or a solution in water.

The oxynitrate additives are conveniently used in the form of solutions or dispersions. It is believed that solutions of the additives are more useful as cell openers than are dispersions thereof. It is, however, noted that concentrations of the oxynitrate additives in liquids typically decrease on filtration and that concentration decreases more with filtration through a finer filter than with filtration through a coarser filter. Such a phenomenon indicates a possibility of dispersions of very small particles of oxynitrate additives rather than, or in addition to, true solutions. The particles would be small enough to pass through the filters used in the practice of the invention. The term "solution" is used herein to refer to mixtures of oxynitrate additives and liquids suitable for use in the practice of the invention, even though a fine dispersion may be present.

When solutions of the oxynitrate additives are used in the practice of the invention, they are suitably prepared in water or in other liquids in which the oxynitrate additive is at least partially or slightly soluble. It is advantageous to utilize a component of a polyurethane formulation as solvent or carrier for the oxynitrate additive. Use of a formulation component avoids dilution of a formulation with materials which could have undesirable effects on the polyurethane foam produced from the formulation. Water or another active hydrogen component of a polyurethane formulation, which component is inert to the oxynitrate salt used, is conveniently used as solvent for oxynitrate additives used in the practice of the invention. A component is inert to an oxynitrate salt if it does not react or otherwise interact with the oxynitrate such as to make it substantially less effective. A reduction in effectiveness which can be compensated for by increased concentration of oxinitrate in a formulation is not generally considered substantial in the practice of the invention.

Liquids advantageous for dissolving or dispersing the oxynitrate additives used in the practice of the invention include active hydrogen compounds such as water and polyols. Polyols in which the oxynitrate additive forms solutions having concentrations greater than about 3 ppm by weight are the preferred polyols. The polyols are suitably any polyol suitable for use as a polyfunctional active hydrogen component in producing a polyurethane foam. Polyether polyols are preferred and, advantageously, are produced from alkylene oxides including ethylene oxide, propylene oxide, butylene oxide and the like. The oxynitrate additives are typically more soluble in polyether polyols having relative higher molecular weights and/or relatively higher proportions of ethylene oxide. Formulations such as formulations for producing slab foams employ polyols having average molecular weights of from about 1500 to 6000, preferably from about 3000 to about 4000, as a major portion of the active hydrogen components; in such formulations, the oxynitrate additives used in the practice of the invention are preferably dissolved or dispersed in the polyol rather than water. In such formulations suitable for forming free rise foams, water solutions of the oxynitrate additives are generally less effective. In formulations suitable for forming molded foams, water is a preferred solvent for the oxynitrate additives used in the practice of the invention. Such formulations typically have as a major active hydrogen component a polyol which has an average molecular weight of about 1000 to about 6000, preferably from about 3500 to about 5000.

Solutions of the oxynitrate additives in liquids suitably have concentrations of the additives ranging from barely detectable amounts up to about saturation concentrations. Supersaturated solutions are also suitably used. When the oxynitrate additive is only slightly soluble in a liquid, use of nearly saturated solutions of oxynitrate additives in the liquid is often convenient to avoid addition of more liquid than is suitable for use in the polyurethane formulation. Oxynitrate additives such as zirconium oxynitrate and the like are preferably used in solutions having concentrations of at least about 3 parts per million (ppm) (anhydrous) oxynitrate salt in a liquid. More preferably, the oxynitrate additives are used in solutions of from about 3 ppm to about 10 weight percent in a liquid. Most preferably, concentrations of the additives in water range from about 0.025 to about 10 percent by weight; while concentrations in organic liquids most preferably range from about 5 to about 50 ppm by weight.

For instance, typical concentrations of zirconium oxynitrate hexahydrate in water are generally less than about 10 percent by weight and conveniently range from about 0.5 to about 5 percent by weight based on weight of the aqueous solution. Preferably, concentrations of from about 1 percent to about 2 weight percent are used. While zirconium oxynitrate is conveniently dispersed and dissolved in typical polyols, such as those which are block or random copolymers of ethylene oxide and/or propylene oxide, to form mixtures having concentrations less than about 1500 ppm by weight, such mixtures, after filtration, leave solutions having concentrations in the range of about 10 ppm to about 700 ppm by weight. Generally, concentrations of (anhydrous) zirconium oxynitrate in a polyol after filtration and suitable for use in the practice of the invention are from about 1 to about 500 ppm, preferably from about 5 to about 50 ppm, more preferably from about 5 to about 25 ppm by weight based on weight of the solution.

The oxynitrate additive is suitably dissolved or dispersed directly in a liquid to be used in a polyurethane formulation. Alternatively, the additive is first admixed with a first liquid such as tetrahydrofuran, methanol, water and the like, and the admixture thereof is subsequently dissolved or dispersed in a second liquid suitable for use in a polyurethane formulation. The first liquid is allowed to remain in the second, or is, alternatively, removed. For instance, the additive may conveniently be dissolved in a first liquid such as methanol, then dispersed in an active hydrogen component such as a polyol for use in a polyurethane formulation. Where it is desirable to remove the first liquid from the second liquid or active hydrogen component, removal is accomplished by means known in the art for such removal such as evaporation of the first compound, distillation, vacuum distillation, gas/vapor stripping, solvent exchange and the like.

Solutions of oxynitrate salts in liquids are suitably formed by mixing more than the amount of oxynitrate salt required for a desired concentration with the liquid to form a coarse dispersion, which often has visible particles of oxynitrate salt therein. Then the dispersion is filtered. It is generally preferable to use a filter with a pore size of less than about 60 microns, such as glass frit filter. A glass frit filter is a filter made by sintering frit, that is, glass which has been melted and quenched to form small particles which are, optionally, milled. Exemplary of such filters are those commercially available from Fischer Scientific Company under the designation glass frit filter funnels. Glass frit filters designated as fine, medium or coarse, that is filters having openings of a size ranging from about 4 microns to about 60 microns in diameter are preferred for filtering solutions of the oxynitrate additives used in the practice of the invention. Glass frit filters designated as fine or medium, that is filters having openings of about 4 microns to about 15 microns are more preferred. Filtration through commonly available paper filters, for instance Whatman #40 ashless filters, is usually insufficient to produce desired results. It is believed that such filtering fails to sufficiently remove particles having sizes that can have an adverse effect on the structure of foams produced. In some instances, solutions of zirconyl nitrate in polyols which are filtered through paper filters can cause foams to collapse. Preferably, particles present in a solution of zirconium oxynitrate are less than about 60 microns in diameter.

A mixture of liquid and oxynitrate salt is suitably heated to achieve solution of the salt in the liquid. Heat sufficient to degrade the salt or liquid is generally avoided.

In using the oxynitrate additives used in the practice of the invention, contact with compounds which are highly acidic or highly basic should generally be avoided to maintain the full activity of the oxynitrate additive. Such acidic and basic compounds include, for instance, mineral acids, and alkali metal hydroxides.

The oxynitrate additives used in the practice of the invention are used in an amount sufficient to produce a foam having measurably more open cells than a foam produced from the same components, and under the same conditions, but without the oxynitrate additive. In the case of free rise foams, open cells are typically indicated by air flow measurements by the procedure of ASTM D-3574-86 (Test G). Open cells can also be demonstrated by microscopy. In the case of molded foams, lack of substantial shrinkage is indicative of open cells. An extent of cell opening is generally preselected between that which would result in susstantial shrinking and that which would result in collapse. Within that range, an extent of cell opening is preselected based on properties needed in the foam. For instance, a foam to be used as a filter will have a preselected extent of cell opening sufficient to allow fluids to pass through and insufficient to allow passage of solids of preselected sizes. Generally, the oxynitrate additives used in the practice of the invention are used in total amounts sufficient to produce a preselected extent of cell opening.

Alternatively, the oxynitrate additives used in the practice of the invention are used in amounts sufficient to modify tin tolerance of a reaction mixture or polyurethane formulation. The tin tolerance is generally increased, that is, more tin may generally be used with an oxynitrate additive than may be used to produce a satisfactory foam without the additive. The range of tin concentrations that are suitably used to produce a foam is also generally increased by use of an oxynitrate additive. The effect of the oxynitrate additives on tin tolerance is especially notable in molded polyurethane or polyurethane-polyurea foams.

The cell opening effect of the additives of the invention is generally observable when the additive is used in amounts greater than about 2 parts per million by weight (ppmw) based on total active hydrogen components. The amount of oxynitrate additive needed in a formulation depends on the extent of cell opening observed in using the formulation without the additive. In free rise polyurethanes, that is polyurethanes allowed to foam in open containers or on substrates such as on conveyor belts, such as polyurethanes produced in processes commonly referred to slab stock processes, the oxynitrate additives of the invention are beneficially used in amounts ranging from about 2 to about 150, preferably from about 3 to about 50, more preferably from about 3 to about 20 ppmw based on total active hydrogen component. In polyurethane foams molded in closed molds, the additives of the invention are advantageously used in amounts of about 2 to about 700 ppmw, preferably from aoout 2 to about 20, more preferably from about 3 to about 15 ppmw.

An oxynitrate additive of the invention is advantageously dissolved or dispersed in a component of a polyurethane formulation, and that component is added to, mixed with and processed with other components and additives in generally the same manner as those components are added, mixed and processed in processes of forming polyurethane foams known to those skilled in the art. Typically, an admixture of oxynitrate additive and an active hydrogen component or water is formed and filtered, then mixed with other active hydrogen components and additives that may be used to form a mixture thereof. The mixture is then admixed with the isocyanate component(s) to form a reaction mixture The reaction mixture is exposed to conditions suitable for foaming and polymerization. Such processes as slab foam processes and molded foam processes and the like are suitably used. Variations in the practice of the invention as applied in slab foam and molded foam processes are noted herein.

It is recognized in the art that preparation of commercially useful foams requires careful balancing of a large number of factors including the components outlined above, catalysts, surfactants, temperatures, speeds of mixing and feeding the foaming mixture to a mold and reaction conditions. The proportion of oxynitrate additive is yet another factor to be balanced in producing a commercial foam. General procedures and problems of providing a balanced mixture and process conditions suitable for a given apparatus are well known to those skilled in the art.

For example, proportions of polyisocyanate component to active hydrogen components, including water, can be varied as a means for changing properties of the polyurethane foam including air flow. Generally the relative proportion of equivalents of polyisocyanate component to equivalents of total active hydrogen components is adjusted to provide a ratio of from about 0.7 to about 1.5 equivalents of isocyanate per equivalent of active hydrogen component. Different ratios are useful to achieve different properties in foam, but generally an excess of isocyanate component is beneficial in obtaining a fully polymerized, stable and useful foam product. The relative proportion of polyisocyanate components to active hydrogen components is generally expressed as isocyanate index. The isocyanate index is the ratio of the number of isocyanate groups in the polyisocyanate component to the number of isocyanate-reactive groups in the active hydrogen starting components multiplied by 100. The polyisocyanate starting component is used in a quantity which provides an isocyanate index for the reaction mixture of from about 70 to about 150, preferably from about 90 to about 130, more preferably from about 100 to about 120.

The term, polyurethane, is used generically herein to denote polymers produced by reaction of at least one polyisocyanate component and at least one polyfunctional active hydrogen component. In the case of mixtures, properties such as hydroxyl functionality or isocyanate functionality are described as an average for components in a mixture. Active hydrogen components are compounds having hydrogen-containing functional groups which will react with an isocyanate group. The Zerewitnoff test described by Woller in the *Journal of the American Chemical Society*, Vol. 49, page 3181 (1927) predicts the tendency of a hydrogen-containing group to react with isocyanates. Compounds having hydroxyl functional groups are preferred active hydrogen compounds for producing polyurethanes using the practice of the invention. Suitable active hydrogen compounds are generally liquids or solids capable of being melted at relatively low temperatures.

Polyisocyanate starting components have two or more isocyanate groups. Diisocyanates are typically used as polyisocyanate starting component. The choice of starting components, as well as the process by which they are reacted, generally determines physical properties of a polyurethane.

Active hydrogen components most commonly used in polyurethane production are those compounds having at least two hydroxyl groups, which compounds are referred to as polyols. Typical polyols include polyester polyols, polyester amide polyols, and polyether polyols having at least two hydroxyl groups. Polyethers and polyesters having hydroxyl terminated chains are preferred for use as relatively high molecular weight active hydrogen containing compounds for use in polyurethanes suitable for use in the practice of the invention. Examples of polyols also include hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers, including polythioethers, acetals, including polyacetals.

Polyether polyols preferably employed in the practice of this invention are polyalkylene polyether polyols including the polymerization products of oxiranes or other oxygen-containing heterocyclic compounds such as tetramethylene oxide in the presence of such catalysts as boron trifluoride, potassium hydroxide and the like, or initiated by water, polyhydric alcohols having from about two to about eight hydroxyl groups, amines and the like. Illustrative alcohols suitable for initiating formation of a polyalkylene polyether include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, pentatols and hexatols. Sugars such as glucose, sucrose, fructose, maltose and the like as well as compounds derived from phenols such as (4,4'-hydroxyphenyl)2,2-propane, and the like are also suitable polyhydric alcohols for initiating formation of polyether polyols useful in the practice of the invention.

Amines suitable for reaction with oxiranes to form polyether polyols include aromatic amines such as aniline, o-chloroaniline, p-phenylene diamine, 1,5-diaminonaphthalene, methylene dianiline, the condensation products of aniline and formaldehyde, 2,4-diamino toluene and the like; aliphatic amines such as methylamine, triisopropanolamine, isopropanolamine, diethanolamine, ethyenediamine, 1,3-propylenediamine, 1,4-propylene diamine, 1,3-butylenediamine, and the like and mixtures thereof. Amine based polyols are exemplified by those disclosed in U.S. Pat. No. 4,358,547.

Exemplary oxiranes suitable for preparation of polyether polyols include ethylene oxide, propylene oxide, butylene oxide, amylene oxide, glycidyl ethers such as t-butyl glycidyl ether, phenyl glycidyl ether, and the like, as well as block or random copolymers of two or more of these oxiranes. Polyether polyols are also prepared from starting materials such as tetrahydrofuran and alkylene oxide copolymers with tetrahydrofuran; epihalohydrins such as epichlorohydrin; arylalkylene oxides such as styrene oxide and the like. Preferably, the polyether polyols are prepared from alkylene oxides having from about two to about six carbon atoms such as ethylene oxide, propylene oxide, and butylene oxide. Polyether polyols suitable for use in the practice of the invention are preferably selected from the group consisting of random copolymers produced from mixtures of ethylene oxide and propylene oxide, and polymers of propylene oxide at least partially capped with ethylene oxide to provide primary hydroxyl groups. The polyether polyols preferably have from about 2 to about 3 hydroxyl groups per molecule. The polyether polyols may be prepared by processes known to those skilled in the art such as those processes described in *Encyclopedia of Chemical Technology*, Vol. 7, pp. 257-262, Interscience Publishers (1951): M. J. Schick, *Nonionic Surfactants*, Marcel Dekker, New York (1967): British Patent 898,306; and U.S. Pat. Nos. 1,922,459; 2,871,219; 2,891,073; and 3,058,921.

Suitable hydroxyl-containing polyesters for use as relatively high equivalent weight active hydrogen compounds in the practice of the invention include those obtained from polycarboxylic acids or polycarboxylic acid anhydrides and polyhydric alcohols. The polycarboxylic acids and anhydrides are suitably aliphatic, cycloaliphatic, aromatic or heterocyclic; they are, optionally, substituted, e.g. by halogen atoms and are, optionally, unsaturated. Illustrative polycarboxylic acids include oxalic acid, malonic acid, succinic acid, glutaric acid adipic acid, pimelic acid, suberic acid, azelaic acid, sebacic acid, oleic acid, trimellic acid, maleic acid, fumaric acid, glutaconic acid, alpha-hydro muconic acid, beta-hydromuconic acid, alpha-butyl-alpha-ethyl-glutaric acid, alpha-beta-diethylsuccinic acid, phthalic acid, isophthalic acid, terephthalic acid, hemimellitic acid, 1,4-cyclohexane-dicarboxylic acid and the like. Any suitable aromatic, aliphatic or heterocyclic polyhydric alcohol may be used. Exemplary polyhydric alcohols include ethylene glycol, 1,2-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, neopentyl glycol, 1,1,1-trimethylolethane, 1,1,1-trimethylolpropane, hexane-1,2,6-triol, tetraethyleneglycol, polypropylene glycol, alpha-methyl glucoside, pentaerythritol, sorbitol, quinitol, mannitol, and the like as well as compounds derived from phenols such as 2,2-(4,4'-hydroxyphenyl)propane, bis(4,4'-hydroxyphenyl)sulfide, bis(4,4'-hydroxyphenyl)sulfone and the like. Polyesters of lactones such as caprolactone and the like or hydroxycarboxylic acid such as hydroxycaproic acid and the like are also suitable active hydrogen containing components.

Other polyols suitable for use in the practice of the invention include polyacetones, hydroxy functional acrylic polymers such as polymers of hydroxyethyl acrylate, hydroxyethyl methacrylate, hydroxypropyl acrylate, hydroxypropyl methacrylate, and the like; polymers of ethylenically unsaturated carboxylic acids such as polymers of vinyl acetate like polyvinyl acetate and the like; hydroxyl-containing epoxy resins; ureaformaldehyde and melamineformaldehyde resins; hydroxyl-containing polycarbonates, such as those prepared by the reaction of diols, such as 1,3-propanediol, 1,4-butanediol, 1,6-hexanediol, diethylene glycol, triethylene glycol or tetraethylene glycol, with diarylcarbonates, e.g. diphenylcarbonate, or phosgene; hydroxyl-containing polyurethanes; methylol resins; starches and other cellulosic polymers; condensation polymers of aniline and formaldehyde and the like; acrylamide polymers; and the like.

Low molecular weight aliphatic polyols such as 1,4-butane diol, ethylene glycol, trimethylolpropane, diethylene glycol, 1,4-cyclohexanedimethanol, and the like; aromatic ring-containing diols such as bis-hydroxyethylhydroquinone, bisphenols, catechol, resorcinol and the like; amide or ester containing diols and the like are suitable for use in the practice of the invention. Mixtures of these low molecular weight polyols and higher molecular weight polyols are similarly useful.

Representatives of the suitable polyols are generally known and are described in such publications as *High Polymers*. Vol. XVI, "Polyurethanes, Chemistry and Technology" by Saunder-Frisch, Interscience Publishers, New York, Vol. I, pp. 32–42, 44–54 (1962) and Vol. II pp 5–6,198–199 (1964); *Kunstoff-Handbuch*, Vol. VII, Vieweg-Hochtlen, Carl-Hanser-Verlag, Munich, pp. 45–71 (1966); and *Organic Polymer Chemistry* by K. J. Saunders, Chapman and Hall, London, pp. 323–325 (1973); and *Developments in Polyurethanes*, Vol 1, J. M. Burst, ed., Applied Science Publishers (1978) pp. 1–76.

Polyols which contain high molecular weight addition or condensation polymers in a finely dispersed form or in solution are optionally used. Such polyols are often called polymer polyols and are obtained when polymerization reactions are carried out in situ in the polyols described above. Processes for the production of these polyols are described in U.S. Pat. Nos. 3,869,413; Re. 28,715; Re. 29,014; and Re. 29,118, which are incorporated herein by reference. For instance, polyethers may be modified with vinyl polymers, e.g., by the polymerization of styrene and/or acrylonitrile in the presence of the polyethers. Polyols having dispersed polyurethane or polyurea particles are also suitable.

Polyisocyanate starting components suitable for use in the practice of the invention are organic compounds that contain at least two isocyanate groups. Such compounds are well known and readily available commercially. Polyisocyanate starting components include aromatic, aliphatic and cycloaliphatic polyisocyanates and combinations thereof. Representative polyisocyanates include diisocyanates such as m-phenylene diisocyanate, toluene-2,4-diisocyanate, toluene-2,6-diisocyanate, hexamethylenediisocyanate, tetramethylene-diisocyanate, cyclohexane-1,4-diisocyanate, hexahydrotoluene diisocyanate (and isomers thereof), naphthylene-1,5-diisocyanate, 1-methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate and the like; triisocyanates such as 4,4',4''-triphenylmethane triisocyanate, toluene-2,4,6-triisocyanate, and the like; tetraisocyanates such as 4,4'-dimethyldiphenyl-methane-2,2',5,5'-tetraisocyanate, 4,4'-dicyclohexanediisocyanate, isophorone diisocyanate, isomers of each and the like; as well as other polyisocyanates such as polyphenylisocyanate and the like and mixtures thereof. Toluene diisocyanate, diphenylmethane-4,4'-diisocyanate, diphenylmethane-2,4'-diisocyanate and polymethylene polyphenylisocyanate are beneficial for use in the practice of the invention because of their availability and properties. Mixtures of polyisocyanate components are suitably used in the practice of the invention.

Polyisocyanates are typically prepared by phosgenation of polyamine precursors. For instance, polyphenyl polymethylene polyisocyanate is prepared by phosgenation of a aniline/formaldehyde condensation product. Crude polyisocyanates are also suitable for use in the practice of the invention. Such crude isocyanates include crude toluene diisocyanates obtained by phosgenation of a mixture of toluene diamines or crude diphenylmethylene diisocyanate obtained by phosgenation of crude diphenylmethylenediamine. Crude isocyanates are disclosed in U.S. Pat. No. 3,215,652.

Diisocyanates useful in the practice of the invention are, optionally, derivatized to form prepolymers or quasi prepolymers. In general, a modified polyisocyanate useful in the practice of the invention has a free isocyanate content of from about 1 to about 40 percent by weight. To form prepolymers, diisocyanate starting components are reacted with less than a stoichiometric amount of at least one polyfunctional active hydrogen-containing component. Suitable active hydrogen-containing components include such as dipropylene glycol, propylene glycol, hydroxy esters, amines, amino alcohols, thiols, thioesters, polypropylene glycols and the like.

One or more catalysts are beneficially used in making polyurethanes. Suitable catalysts include tertiary amines, such as, triethylenediamine, N-methyl morpholine, N-ethyl morpholine, diethyl ethanolamine, N-coco morpholine, 1-methyl-4-dimethylaminoethyl piperazine, 3-ethoxy-N-dimethylpropylamine, N,N-dimethyl-N',N'-methyl isopropyl propylene diamine, N,N-diethyl-3-diethylaminopropylamine, dimethyl benzylamine, triethylamine, tributylamine, bis(N,N-diethylaminoethyl)adipate, 2-methylimidazole, 1,4-diaza-bicyclo-(2,2,2)-octane and the like. Other suitable catalysts nclude tin compounds such as stannous chloride, tin salts of carboxylic acids such as dibutyltin di-2-ethyl hexoate, dibutyl tin dilaurate, dibutyltin diacetate, di-2-ethylhexyltin oxide, and the like, as well as other organometallic compounds such as compounds of lead, arsenic, antimony, mercury and bismuth and compounds disclosed in U.S. Pat. No. 2,846,408 and the like. Silamines having carbon-silicon bonds such as those described in German Pat. No. 1,229,290 including 2,2,4-trimethyl-2-silamorpholine and the like as well as basic nitrogen compounds such as tetraalkylammonium hydroxides, alkali metal hydroxides such as sodium hydroxide, alkali metal phenolates such as sodium phenolate, and alkali metal alcoholates, such as sodium methylate, hexahydrotriazines and the like are also useful catalysts. Mixtures of catalysts are also suitable.

Mixtures of catalysts frequently useful in forming foams from isocyanate components and active hydrogen components, especially when the active hydrogen components include water. Tertiary amines are effective in catalyzing reaction between water and isocyanate groups. Transition metal salts and complexes are effective in catalyzing polymerization of polyisocyanates and other active hydrogen components, like polyols. Mixtures of such transition metal compounds as compounds of tin, iron and the like with tertiary amine catalysts are, therefore, beneficially used in the practice of the invention.

Metal atom-containing catalysts are generally used in a quantity of from about 0.0025 to 0.5 percent by weight based on active hydrogen containing starting components. Amine catalysts are generally used in a quantity of from about 0.001 to 5 percent by weight based on active hydrogen containing starting components. Those skilled in the art are able to select a catalyst composition and quantity suitable to accelerate the reaction between starting components. Representative catalysts and details regarding their use are found in *Kunstoff-Handbuch*, Vol. VII, published by Vieweg and Hochtlen, Carl-Hanser-Verlag, Munich 1966, pp. 96–102.

For production of a foam of uniform quality with good reproducability the proportion of mixed starting components, catalysts, blowing agents and other additives should be controlled as precisely as possible. However, particularly in large industrial processes, maintaining exactly constant amounts of catalysts is very difficult. The quality of foam produced tends to vary because the amount of catalyst occasionally falls outside the narrow range of tin tolerance. Those skilled in the art recognize tin tolerance of a formulation by shrinking or splitting in foams produced using tin compounds outside the range of concentrations tolerated. Use of the oxynitrate additives employed in the practice of the invention changes tin tolerance of a formulation, that is, it changes the concentration of tin-containing compound that is suitably present in a formulation from which a foam which does not exhibit substantial shrinking or splitting can be produced. Substantial shrinking or splitting is used herein to refer to shrinking or splitting to an extent not generally acceptable for commercially produced foams. For instance, generally, shrinkage of about 50 volume percent or less as determined by the loss in height between the center of a foam and an edge thereof is considered commercially acceptable for flexible molded foams. The least shrinkage attainable is generally preferred. Generally visible splitting is not tolerable in commercially produced foams.

A blowing agent is generally used to generate the gas or vapor for formation of bubbles in foam formation. Any blowing agent or mixture thereof is suitable for use in the practice of the invention. Suitable blowing agents include inorganic blowing agents such as water; organic blowing agents which expand, are volatile or split off volatile compounds at temperatures in the mold; and gases which are dissolved or mixed in the foam-forming mixture. Suitable organic blowing agents include acetone; ethyl acetate; methanol; ethanol; halogen substituted alkanes such as methylene chloride, chloroform, ethylidene chloride, vinylidene chloride, monofluorotricholormethane, chlorodifluoromethane, dichlorodifluoromethane and the like; butane; hexane; heptane; diethyl ether; and the like. Gases inert to the starting components such as nitrogen, air, carbon dioxide and the like are also useful blowing agents. Compounds such as azides which decompose at temperatures present in the mold to produce gases such as nitrogen are also useful.

The amount of blowing agent employed is not critical but should be sufficient to foam the reaction mixture. Said amount will vary with factors such as the density desired in a foamed product. Generally, from about 0.0005 to about 0.3 moles of gas or vapor is used for each one hundred grams of reaction mixture having an isocyanate to active hydrogen ratio of about one to one, in order to produce a foam having a density from about 0.8 to about 5 pound per cubic foot (from about 12.8 to about 80.1 kilograms per cubic meter).

Water is a particularly useful blowing agent for use in the practice of the invention. It costs little and adds stability to foaming. In addition to generating gas for foaming, water reacts quickly with polyisocyanate components to form polyurea chains, thus contributing to early polymer strength needed for gas retention. Generally, when water is used, it is present in proportions of from about 1.5 to about 8 weight percent of water based on total weight of active hydrogen components. Blowing agents which do not react with isocyanate can be used with water. The oxynitrate additives used in the practice of the invention are conveniently mixed with the water used as blowing agent in a polyurethane formulation.

Additives such as surface active agents, antistatic agents, plasticizers, fillers, flame retardants, pigments, stabilizers such as antioxidants, fungistatic and bacteriostatic substances and the like are optionally used in polyurethanes.

In producing polyurethane foams by the process of the invention, it is generally advantageous use a foam stabilizer, catalyst and blowing agent in balanced proportions to obtain a foam of a preselected cell size, structure and density. Suitable foam stabilizers are generally wetting agents or surface active agents. Nonionic surfactants and wetting agents are generally preferred. Suitable foam stabilizers include hydrophilic, and advantageously water soluble, organosilicon compounds, such as those having a polydimethylsiloxane group attached to a copolymer of ethylene oxide and propylene oxide and the like. Exemplary foam stabilizing compounds are disclosed in U.S. Pat. No. 2,764,565. Organo-silicon foam stabilizers are well known to those skilled in the art. Other surface active compounds are also suitable for use in polyurethane foams. Such foam stabilizers, cell regulating additives, surface active compounds and proprietary combinations thereof are generally commercially available with specific instructions as to their use. These compounds include paraffins, fatty alcohols, dimethylpolysiloxanes and the like.

Several characteristics of flexible foams indicate aspects of their formation and properties. Cream time, rise time and blow off are routinely measured during foam production. Cream time is the time from introduction of polyisocyanate components into active hydrogen components until a foaming mass changes from clear to opaque. Rise time is the time from introduction of polyisocyanate components into active hydrogen components until a foam completes its rising, that is, until the foam reaches its greatest volume. A free rise foam generally completes its rising at blow off, which is when carbon dioxide (and other gases, if a blowing agent is used) are released. Occurrence of blow off generally indicates that a balanced foam formulation has been used.

Air flow is another important physical property of a foam. Air flow is a measure of the air which will pass through a foam. It is measured according to ASTM D-3574-86 (test G) in cubic feet per minute (cfm) (1 cfm is about 0.47193 liters per second (l/sec)). A desired air flow for a free rise, flexible foam is generally in the range of from about 2 cfm to about 7 cfm (about 0.9 to 3.3 l/sec). Molded foams have air flows of from about 0.1 to about 7 cfm (0.05 l/sec to about 3.3 l/sec).

Density and indention force deflection are additional important physical properties of foams. A typical flexible foam has a density ranging from about 0.8 to about 32 pounds per cubic foot (pcf), preferably from about 0.8 to about 8 pcf, more preferably from about 0.8 to about 5 pcf (about 13 to 80 g/l). Indention force deflection, abbreviated IFD herein, is a measure of a foam's hardness. It is measured in pounds (lb.) according to the procedure of ASTM D-3574-86. A higher IFD indicates a firmer foam than a foam having a lower IFD. Foams having different IFD values are used in different applications.

The following examples are offered only for purposes of illustrating the process and composition of the invention and are not to be viewed as limiting the present invention. All parts and percentages are on a weight basis unless otherwise indicated. Zirconium oxynitrate is assumed to be without water of hydration for all calculations unless stated otherwise. Examples of the invention are designated numerically, with the abbreviation "EX." being used in the tables for examples. Comparative samples are not examples of the invention and are designated with alphabetic characters and are indicated by the abbreviation "C.S." in the tables.

EXAMPLES 1 AND 2 AND COMPARATIVE SAMPLE A

Formation of Cup Foams

A cloudy admixture of 0.5 g zirconium oxynitrate (predominately hexahydrate) and 100 g. of a nominal polyether triol which is about 87% propylene oxide and 13% ethylene oxide polyol having a molecular weight of about 3000–4000 (referred to hereinafter as Polyol 1) is formed. The admixture is observed to have particles of solid in the bottom. The admixture is heated to about 80° C. for a period of 2 hours during which stirring is maintained by use of a magnetic stirrer. Particles are still visible.

The admixture is then filtered while warm through a coarse glass frit filter having openings measuring about 40 to about 60 microns, commercially available from Fisher Scientific Company. A solution is obtained as a filtrate. The solution is referred to hereinafter as Solution A.

The solution is analyzed by emission spectroscopy and found to have 210 ppmw zirconium which would correspond to 532 ppmw zirconium oxynitrate with no molecules of water of hydration per molecule of zirconium oxynitrate.

Flexible foams are produced on a small scale from the formulations in Table I by a cup foam procedure which approximates conditions found in production of slab stock foams because containers used as cups are open rather than closed (as a mold would be). A masterbatch is formed from the water, silicone and amine catalyst as indicated in Table I. The silicone compound is a polysiloxane polyalkylene oxide block copolymer available from Goldschmidt AG under the trade designation Tegostab ® BF-2370. The amine catalyst is a mixture of 70% by weight bis(dimethylaminoethyl)ether and 30% by weight dipropylene glycol, commercially available from Union Carbide, Corp. under the trade designation NIAX ® A-1. The masterbatch is mechanically shaken for 10 minutes. Meanwhile, samples of the indicated amounts of low acidity toluene diisocyanate (TDI) having an isomeric weight ratio of about 80 toluene 2,4 diisocyanate to about 20 toluene 2,6 diisocyanate, commercially available from Dow Chemical Company under the trade designation Voranate ® T-80, is measured into separate 100 cubic centimeter (cc) beakers and set aside. Samples of the indicated amounts of Polyol 1 are measured into separate one quart (0.946 liter) size paper cups. The indicated mmounts of Solution A are added to the polyol samples to make a total of 100 grams of polyol in each cup.

Masterbatch equivalent to the amounts of each ingredient thereof listed in Table I, that is, 4.5 grams of masterbatch, is added to each polyol sample and stirred for 15 seconds using a small electric mixer. A stopwatch is started when mixing begins. Stirring is stopped for addition of the indicated amount of stannous octoate catalyst. Mixing is resumed for 5 seconds. When the stopwatch reaches 25 seconds, the indicated amounts of diisocyanate are added quickly to form mixtures which are stirred 5 seconds, after which stirring is stopped. Each mixture is then poured into an 80 ounce (oz) (2.4 liters (l)) carton and allowed to form a foam. The foam is cured in air at room temperature overnight. The carton is then torn off the foam. A sample measuring $2'' \times 2'' \times 1''$ (high) (5 cm $\times$ 5 cm $\times$ 2.5 cm) is cut from the foam using a band saw.

Air flow of each sample is measured by the procedure of ASTM D-3574-86 (Test G), using an air flow meter produced by Amscor, Inc. Density is determined by weighing each sample of foam and dividing the weight by the volume of the sample.

TABLE I

| COMPONENT | C.S. A | EX. 1 | Ex. 2 |
|---|---|---|---|
| POLYOL 1 | 100 | 85 | 75 |
| INDEX | 108 | 108 | 108 |
| ISOCYANATE | 46.7 | 46.7 | 46.7 |
| WATER | 3.6 | 3.6 | 3.6 |
| SILICONE | 0.8 | 0.8 | 0.8 |
| AMINE CATALYST | 0.10 | 0.10 | 0.10 |
| TIN CATALYST | 0.325 | 0.325 | 0.325 |
| ZR. SOLUTION* A | 0 | 15 | 25 |
| RISE (sec.) | 87 | 114 | 136 |
| AIR FLOW cc/min. | 0.32 | 2.2 | 5.9 |
| DENSITY (lb./ft.$^3$) | 1.5 | 1.5 | 1.4 |

*ZR SOLUTION is a solution of 532 ppm zirconium oxynitrate in the polyol.

The data in Table I shows a substantial increase in air flow is obtained using about 80 and 133 ppm by weight based total active hydrogen components of zirconium oxynitrate.

EXAMPLES 3–5 AND COMPARATIVE SAMPLES B–D

Preparation of Cup Foams

The procedure of Example 1 is repeated for Examples 3–5 and comparative samples B–D, except that for Examples 3 and 4 and Samples B and C, a 20 ppm solution of zirconium oxynitrate in the polyol is prepared as in Example 1 and also filtered through a medium glass frit filter (having openings of about 10 to about 15 microns); and no masterbatch is formed. Instead, water, silicone, tin catalyst and amine catalyst are measured individually for each sample. For Comparative Sample D, no masterbatch is used, and a 2 percent by weight solution of zirconium oxynitrate hexahydrate in water is prepared by the procedure of Example 1 except that the admixture is heated to 50° C., and is not filtered because it is a clear solution.

Foam formulations having the amounts of the ingredients indicated in Table II are produced and allowed to foam as in Example 1. Rise density and air flow measurements made as in Example 1 are shown in Table II.

TABLE II

| COMPONENT | C.S. B | EX. 3 | Ex. 4 | Ex. 5 | C.S. C | C.S. D |
|---|---|---|---|---|---|---|
| POLYOL | 100 | 75 | 50 | 25 | 0 | 100 |
| INDEX | 108 | 108 | 108 | 108 | 108 | 108 |
| ISOCYANATE | 46.7 | 46.7 | 46.7 | 46.7 | 46.7 | 46.7 |
| WATER | 3.6 | 3.6 | 3.6 | 3.6 | 3.6 | 0 |
| SILICONE | 0.8 | 0.8 | 0.8 | 0.8 | 0.8 | 0.8 |
| AMINE CATALYST | 0.10 | 0.10 | 0.10 | 0.10 | 0.10 | 0.10 |
| TIN CATALYST | 0.325 | 0.325 | 0.325 | 0.325 | 0.325 | 0.325 |
| ZR. SOLUTION | 0 | 25* | 50* | 75* | 100* | 3.6** |
| RISE | 81 | 87 | 93 | 115 | — | 98 |
| AIR FLOW cfm | 0.61 | 2.3 | 5.4 | 5.6 | split | 0.54 |
| DENSITY lb/ft$^3$ | 1.52 | 1.52 | 1.43 | 1.62 | — | 1.43 |

*ZR SOLUTION is a solution calculated to have 200 ppm anhydrous zirconium oxynitrate in the polyol.
**ZR SOLUTION is a solution of 2 percent by weight zirconium oxynitrate hexahydrate in water.

Examples 1 through 5 show that foams having properties within commercially acceptable ranges can be made by addition of zirconium oxynitrate to urethane-forming compositions. The data in Table II shows that air flow measurements of foams having zirconium oxynitrate incorporated therein as a solution in a polyol are generally greater than that of similar foams made without the zirconium oxynitrate. Comparative Sample C shows that splitting may occur when a high concentration of zirconium oxynitrate is used. Comparative Sample D shows that use of a zirconium oxynitrate solution in water in this free rise foam formulation produces a foam having characteristics similar to those of a foam having no zirconium oxynitrate.

EXAMPLES 6–9 AND COMPARATIVE SAMPLE E

Preparation of Cup Foams Having Differing Solutions of Zirconium Salts

The procedure of Example 1 is repeated using a masterbatch and the amounts of ingredients specified in Table III. For each example, 25 grams of a zirconium salt solution (designated Solutions I-IV in Table III) are used. The solutions are prepared as follows:

SOLUTION I:

A mixture containing 0.5 weight percent zirconium oxynitrate hexahydrate in the polyol of Example 1 is prepared by mixing 1 g. zirconium oxynitrate hexahydrate and 199 g. of the polyol. The mixture is heated for 3 hours at 50°, then 30 minutes at 75° C. with stirring. The mixture is then filtered through a coarse fritted glass filter funnel while still warm. A coarse filter is one which allows passage of particles less than 60 μm in size (and dissolved compounds). The resulting solution is somewhat cloudy. The filtered solution is analyzed by emission spectroscopy and found to have a zirconium concentration of 210 ppm by weight. Such a zirconium concentration would correspond to a concentration of 532 ppm by weight anhydrous zirconium oxynitrate in the polyol.

SOLUTION II:

A 50 g. sample of the mixture of zirconium oxynitrate and polyol prepared for Solution I is filtered through a medium fritted glass filter funnel, that is one allowing passage of particles having diameters less than about 15 microns. The resulting solution is substantially clear and is orange in color. The filtered solution is analyzed by emission spectroscopy and found to have a zirconium concentration of 6 ppm, corresponding to a concentration of 15.2 ppm by weight of anhydrous zirconium oxynitrate in the polyol. The solution is stored for seven days at room temperature before use in forming foams.

SOLUTION III:

A 50 g. sample of Solution I is filtered through a fine fritted glass filter funnel which allows passage of particles having diameters less than about 5.5 microns. The resulting solution is substantially clear. The filtered solution is analyzed by emission spectroscopy and found to have a concentration of 5 ppmw zirconium, corresponding to a concentration of 12.7 ppm by weight of anhydrous zirconium oxynitrate in the polyol.

SOLUTION IV:

A mixture of 1 g. zirconium oxynitrate hexahydrate and 199 g. of polyol is formed and heated first 3 hours at 50° C., then 30 minutes at 75° C. with stirring. The mixture is filtered through a medium fritted glass filter funnel to obtain a redish filtrate solution. The filtrate solution is analyzed by emission spectroscopy and found to have a 5.9 concentration of zirconium, corresponding to a concentration of 15.0 ppm by weight of anhydrous zirconium oxynitrate in the polyol. The solution is used within 3 days of preparation.

Table III lists the components of polyurethane foam-forming formulations used in Examples 6–9 and Comparative Sample E. The air flow, density and rise time of each foam are also shown in Table III.

TABLE III

| COMPONENT | C.S. E | EX. 6 | Ex. 7 | Ex. 8 | Ex. 9 |
|---|---|---|---|---|---|
| POLYOL | 100 | 75 | 75 | 75 | 75 |
| INDEX | 108 | 108 | 108 | 108 | 108 |
| ISOCYANATE | 46.8 | 46.8 | 46.8 | 46.8 | 46.8 |
| WATER | 3.6 | 3.6 | 3.6 | 3.6 | 3.6 |
| SILICONE | 0.8 | 0.8 | 0.8 | 0.8 | 0.8 |
| AMINE CATALYST | 0.10 | 0.10 | 0.10 | 0.10 | 0.10 |
| TIN CATALYST | 0.325 | 0.325 | 0.325 | 0.325 | 0.325 |
| ZR. SOLUTION | 0 | 25 of I | 25 of II | 25 of III | 25 of IV |
| RISE (sec.) | 80 | 111 | 96 | 93 | 127 |
| AIR FLOW (cfm) | 0 | 3.5 | 4.7 | 4.2 | 5.7 |
| DENSITY g/cm$^2$ | 0.026 | 0.029 | 0.027 | 0.027 | 0.027 |

The data in Table III shows that use of zirconium oxynitrate solutions in foam forming formulations results in foams having increased air flow compared to a foam (C.S.E) not having zirconium oxynitrate. Foams having incorporated therein polyol solutions of zirconium oxynitrate which are filtered through a fine or medium glass frit filter, that is Examples 9–11, have somewhat larger air flows than has a similar foam (Example 8) having incorporated therein such a solution which is coarsely filtered.

EXAMPLE 10 AND COMPARATIVE SAMPLES F-H

Preparation of Molded Foams Using Zirconium Oxynitrate Solutions in Polyol

The following procedure for making molded foams is followed for the formulations shown in Table IV and designated Comparative Samples F-H and Example 10, respectively:

A masterbatch is formed of copolymer polyol (designated as Polyol A and formed from styrene, acrylonitrile, isocyanoethyl methacrylate and a polyol having an average molecular weight of about 4750 and formed from a mixture propylene oxide and ethylene oxide in a polyoxypropylene ether polyol having an average molecular weight of about 4080, the polyol being endcapped with ethylene oxide to make a polyol having an average molecular weight of about 4850); water; diethanolamine (DEOA) and amine catalysts. The amine catalysts are a 70% solution of bis (dimethylaminoethyl ether) in dipropylene glycol, commercially available from Union Carbide Corporation under the trade designation NIAX® A-1; a 33% solution of triethylene diamine in dipropylene glycol, commercially available from Air Products and Chemicals under the trade designation Dabco® 33-LV: and pentamethyl, dipropylene triamine. The masterbatch contains sufficient amounts of each of the ingredients for five samples having the quantities designated in Table IV. The masterbatch is mixed for about 5 minutes on a small electric mixer.

A mixture is formed of 18.7 g. zirconium oxynitrate hexahydrate and 3740.5 g. of a glycerine-initiated ethylene oxide/propylene oxide polyol having a molecular weight of about 5000 (designated in Table IV as Polyol B). The mixture is heated for 2 hours at 50° C. and then for 30 minutes at 75° C. with stirring by air driven stirrer. The mixture is then filtered while warm through a coarse fritted glass filter funnel to remove solids and leaving a green filrate. Analysis by emission spectroscopy shows that the filtrate has a zirconium concentration corresponding to 1470 ppmw of anhydrous zirconium oxynitrate in the polyol. The filtrate is cloudy and is shaken before use in each example or sample.

For each sample in Table IV, a 55.7 gram sample of the masterbatch is measured and placed in an 80 oz paper cup without stirring. To the masterbatch, are added sequentially the amounts of the following ingredients indicated in Table IV: the polyol designated Polyol B, the solution of zirconium oxynitrate in Polyol B, a siloxane surfactant available from Union Carbide Corp. under the trade designation Y-10184 designated as silicone compound; and a tin catalyst, dibutyl tin mercaptide, commercially available under the trade designation Fomrez® UL-1.

After the above ingredients are mixed by a small electric mixer for 15 seconds, a mixture thereof with 48.2 grams of the toluene diisocyanate of Example 1 is formed. After 5 seconds of stirring with a small electric mixer, the mixture is poured into a mold measuring about 8 in. by 8 in. by 3 in. high (about 20.3 cm by 20.3 cm. by 7.6 cm), which is removed from an oven maintained at 250° F. (121° C.). The mold has a temperature of 150° F. (65° C.). The top of the mold is clamped shut. The rise time indicated in Table IV is that time from the time the isocyanate is added to the mixture until foaming mass comes through small holes in the top of the mold. Two minutes after addition of the isocyanate, the mold containing foam is placed back into the 250° F. (121° C.) oven for a period of four minutes. After the four minutes have elapsed, the foam is removed and allowed to cool at room temperature. Shrinkage is then determined as a percentage of the thickness at the center of the foam relative to thickness at an edge thereof.

TABLE IV

| COMPONENT | C.S. F | Ex. 10 | C.S. G | C.S. H |
|---|---|---|---|---|
| POLYOL A | 50 | 50 | 50 | 50 |
| POLYOL B | 50 | 25 | 0 | 25 |
| INDEX | 105 | 105 | 105 | 105 |
| ISOCYANATE | 48.2 | 48.2 | 48.2 | 48.2 |
| WATER | 3.8 | 3.8 | 3.8 | 3.8 |
| SILICONE | 1.65 | 1.65 | 1.65 | 1.65 |
| Diethanolamine | 1.7 | 1.7 | 1.7 | 1.7 |
| AMINE CATALYST mixture | 0.435 | 0.435 | 0.435 | 0.435 |
| TIN CATALYST | 0.0042 | 0.0042 | 0.0042 | 0.0042 |
| ZR. SOLUTION in polyol B | 0 | 25 | 50 | 25 |
| ppm zirconium oxynitrate* | 0 | 367.5 | 735 | 367.5 |
| RISE TIME sec. | 35 | 40 | 65 | very slow |
| % SHRINKAGE | 22 | 0 | collapse | collapse |

*PPM zirconium oxynitrate is expressed in terms of parts per million by weight of total polyol, calculated from emission spectroscopy showing concentration of zirconium in solution.

The data in Table IV shows that in the foam-forming formulations used, an amount of zirconium oxynitrate solution corresponding to about 367.5 ppmw anhydrous zirconium oxynitrate in total polyol can eliminate shrinkage (Example 10). Collapse of the foam of Comparative Sample G is believed to indicate a possible sensitivity of the formulation to 735 ppmw of anhydrous zirconyl oxynitrate. Collapse of the foam of Comparative Sample H is unexplained but is believed to indicate that 367 ppmw is approaching the upper limit of useful concentrations of zirconium oxynitrate in this formulation.

EXAMPLES 11-14 AND COMPARATIVE SAMPLE J

Formation of Molded Foams Using Zirconium Oxynitrate in Water Solutions and Polyol Solutions The procedure of Example 10 is repeated using the quantities indicated in Table V and using, in Examples 11 and 12, a solution of one percent by weight zirconium oxynitrate in water instead of the solution of zirconium oxynitrate in polyol B. The solution in water is prepared by forming an admixture of 99 g. of deionized water and 1 g. of zirconium oxynitrate hexahydrate. The admixture is stirred by magnetic stirring at 50° C. until all solids are dissolved. In Examples 13 and 14 the polyol solution of Example 10 is used.

TABLE V

| COMPONENT | C.S. J | Ex. 11 | Ex. 12 | Ex. 13 | EX. 14 |
|---|---|---|---|---|---|
| POLYOL A | 50 | 50 | 50 | 50 | 50 |
| POLYOL B | 50 | 50 | 50 | 25 | 35 |
| INDEX | 105 | 105 | 105 | 105 | 105 |
| ISOCYANATE | 48.1 | 48.1 | 48.1 | 48.1 | 48.1 |
| WATER | 3.8 | 0 | 1.8 | 3.8 | 3.8 |
| SILICONE | 1.65 | 1.65 | 1.65 | 1.65 | 1.65 |
| Diethanolamine | 1.7 | 1.7 | 1.7 | 1.7 | 1.7 |
| AMINE CATALYST mixture | 0.435 | 0.435 | 0.435 | 0.435 | 0.435 |
| TIN CATALYST | 0.0042 | 0.0042 | 0.0042 | 0.0042 | 0.0042 |
| ZR. SOLUTION in polyol B | 0 | 0 | 0 | 25 | 15 |
| ZR. SOLUTION in water | 0 | 3.8 | 2.0 | 0 | 0 |
| ppm zirconium oxynitrate | 0 | 380 ‡ | 200 ‡ | 367.5*** | 220.5*** |
| RISE TIME sec. | 39 | 58 | 45 | 52* | 50** |
| % SHRINKAGE | 18.75 | 4.17 | 12.5 | 4.17 | 10.42 |

*Repetition of this sample gives a rise time of 38 sec. with no measurable shrinkage.
**Repetition of this sample gives the same rise time and slow curing.
***PPM zirconium oxynitrate (anhydrous) is expressed in terms of parts per million by weight of total polyol, calculated from emission spectroscopy showing concentration of zirconium in solution.
‡ Based on solution of zirconium oxynitrate hexahydrate.

The data in Table V shows that use of similar concentrations of zirconium oxynitrate in water and polyol solutions is effective in this molded foam formulation to substantially reduce shrinkage of the foams.

EXAMPLES 15-17 AND COMPARATIVE SAMPLES K-M

Preparation of Cup Foams Having Varying Tin Catalyst Levels

The procedure of Example 1 is repeated for Examples 15-17 and comparative samples K-M, except that for Examples 15-17, a 0.35 weight percent solution of zirconium oxynitrate hexahydrate in the polyol is prepared as in Example 1 using a coarse glass frit filter, and no masterbatch is formed. Instead, water, silicone, and amine catalyst and tin catalyst are measured individually for each sample. The final concentration of zirconium oxynitrate in Examples 15-17, as calculated from the zirconium detected by emission spectroscopy, is 175 ppm anhydrous zirconium oxynitrate in total polyol.

Foam formulations having the amounts of the ingredients indicated in Table VI are produced and allowed to foam as in Example 1. Rise density and air flow measurements made as in Example 1 are shown in Table VI.

TABLE VI

| COMPONENT | C.S. K | C.S. L | C.S. M | Ex. 15 | EX 16. | EX 17 |
|---|---|---|---|---|---|---|
| POLYOL | 100 | 100 | 100 | 50 | 50 | 50 |
| INDEX | 108 | 108 | 108 | 108 | 108 | 108 |
| ISOCYANATE | 46.7 | 46.7 | 46.7 | 46.7 | 46.7 | 46.7 |
| WATER | 3.6 | 3.6 | 3.6 | 3.6 | 3.6 | 0 |
| SILICONE | 0.8 | 0.8 | 0.8 | 0.8 | 0.8 | 0.8 |
| AMINE CATALYST | 0.10 | 0.10 | 0.10 | 0.10 | 0.10 | 0.10 |
| TIN CATALYST | 0.20 | 0.25 | 0.30 | 0.8 | 0.9 | 1.0 |
| ZR. SOLUTION | 0 | 0 | 0 | 50* | 50* | 50* |
| AIR FLOW cfm | 3.9 | 0.5 | 0.18 | 3.5 | 2.3 | 0.49 |

*ZR SOLUTION is a solution calculated to have 175 ppm anhydrous zirconyl nitrate in the polyol solution.

Reductions in shrinkage and accompanying raising of air flow in polyurethane foams are generally associated with reduced tin-containing catalyst levels. Table VI shows that in foam-forming formulations incorporating oxynitrate salts according to the practice of the invention, air flow is maintained without decreasing tin-containing catalyst concentrations. For instance, Example 15 and Comparative Sample K have similar air flows, as do Example 17 and Comparative Sample L, but more tin-containing catalyst is used in the Examples which contain zirconium oxynitrate. Use of zirconium oxynitrate, thus, allows the use of greater concentrations of tin-containing catalyst than would otherwise be possible in the formulations without the oxynitrate salts. Oxynitrate salts used according to the practice of the invention, thus, modify the tin tolerance of such formulations. Generally, use of oxynitrate salts according to the practice of the invention also enlarges the range of concentrations of tin-containing catalysts that are suitably used in a polyurethane forming composition.

The examples of the invention show that zirconium oxynitrate in solution in polyols or in water is useful as a cell opener and/or shrinkage limiting agent in a variety of polyurethane foam-forming formulations. These examples are only exemplary of the wide utility of the process of the invention which is expected to have similar effects in any polyurethane foam-forming formulation, including those formulations which also utilize other blowing agents and/or fillers, as well as formulations including different active hydrogen compounds, different isocyanates, different catalysts and different additives, such as different silicone compounds.

We claim:

1. In a process for producing polyurethane foam by allowing a reaction mixture comprising at least one polyisocyanate component and at least one polyfunctional active hydrogen component to react, the improvement which comprises employing an oxynitrate compound selected from the group consisting of oxynitrate salts of metals of Group IV B of the Mendeleef periodic table in an amount effective to provide open cells in a resulting foam.

2. The process of claim 1 which is a free rise foaming process wherein cell opening is increased sufficiently to measurably increase air flow through the foam.

3. The process of claim 1 which is a molded foam process wherein the oxynitrate compound is employed in an amount sufficient to reduce shrinkage of the foam.

4. The process of claim 1 wherein a tin-containing catalyst is used, and the oxynitrate compound is employed in an amount sufficient to increase the amount of tin-containing catalyst useful in the reaction mixture to form a foam not having substantial shrinkage.

5. The process of claim 1 wherein the active hydrogen component comprises at least one polyol.

6. The process of claim 1 wherein the polyisocyanate component comprises at least one aromatic polyisocyanate.

7. The process of claim 1 wherein the process occurs in the presence of a blowing agent.

8. The process of claim 7 wherein the blowing agent comprises water.

9. The process of claim 1 wherein the oxynitrate compound comprises zirconium oxynitrate.

10. The process of claim 9 which is a free rise process and wherein the amount of zirconium oxynitrate is in the range of from about 2 to about 150 parts per million by weight based on total weight of active hydrogen components.

11. The process of claim 9 which is a molded foam process and wherein the amount of zirconium oxynitrate is in the range of from about 2 to about 700 parts per million by weight based on total active hydrogen components.

12. The process of claim 9 wherein an admixture of the oxynitrate compound and a liquid is formed before addition thereof to the reaction mixture.

13. The process of claim 12 wherein the liquid is water.

14. The process of claim 12 wherein the liquid is an organic polyfunctional active hydrogen compound and the admixture is passed through a filter before addition of a filtrate thereof to the reaction mixture.

15. The process of claim 14 wherein the filter is a glass frit filter.

16. The process of claim 15 wherein particles larger than about 60 microns are excluded from the filtrate.

17. The process of claim 14 wherein the liquid is a polyol.

18. The process of claim 14 wherein the liquid is a polyether polyol.

19. In a process for producing polyurethane foam by allowing a reaction mixture comprising at least one polyisocyanate component and at least one polyfunctional active hydrogen component to react, the improvement which comprises employing an oxynitrate compound selected from the group consisting of oxynitrate salts of metals of Group IV B of the Mendeleef periodic table in an amount effective to modify the tin tolerance of a resulting foam.

20. The process of claim 19 which is a molded foam process wherein the oxynitrate compound is employed in an amount sufficient to reduce shrinkage of the foam.

21. The process of claim 19 wherein the active hydrogen component comprises at least one polyol.

22. The process of claim 19 wherein the polyisocyanate component comprises at least one aromatic polyisocyanate.

23. The process of claim 19 wherein the process occurs in the presence of a blowing agent.

24. The process of claim 23 wherein the blowing agent comprises water.

25. The process of claim 19 wherein the oxynitrate compound comprises zirconium oxynitrate.

26. The process of claim 25 which is a free rise process and wherein the amount of zirconium oxynitrate is in the range of from about 2 to about 150 parts per million by weight based on total weight of active hydrogen components.

27. The process of claim 25 which is a molded foam process and wherein the amount of zirconium oxynitrate is in the range of from about 2 to about 700 parts per million by weight based on total active hydrogen components.

28. The process of claim 25 wherein an admixture of the oxynitrate compound and a liquid is formed before addition thereof to the reaction mixture.

29. The process of claim 28 wherein the liquid is water.

30. The process of claim 28 wherein the liquid is an organic polyfunctional active hydrogen compound and the admixture is passed through a filter before addition of a filtrate thereof to the reaction mixture.

31. The process of claim 30 wherein the filter is a glass frit filter.

32. The process of claim 30 wherein particles larger than about 60 microns are excluded from the filtrate.

33. The process of claim 30 wherein the liquid is a polyol.

34. The process of claim 30 wherein the liquid is a polyether polyol.

* * * * *